(12) United States Patent
Griskin et al.

(10) Patent No.: US 6,200,524 B1
(45) Date of Patent: Mar. 13, 2001

(54) METHOD OF MANUFACTURING OF A MECHANICAL FACE SEAL

(75) Inventors: Yefim Griskin; Natalya Griskin, both of Yokneam Yllit (IL)

(73) Assignee: Mech Coating Ltd., Haifa Bay (IL)

( * ) Notice: Subject to any disclaimer, the term of this patent is extended or adjusted under 35 U.S.C. 154(b) by 0 days.

(21) Appl. No.: 09/301,625

(22) Filed: Apr. 29, 1999

(51) Int. Cl.$^7$ ....................................... B22F 7/04
(52) U.S. Cl. .................... 419/8; 419/18; 75/240
(58) Field of Search .............................. 419/8, 9, 17, 18; 75/240

(56) References Cited

U.S. PATENT DOCUMENTS 4,280,841   7/1981   Ito et al. .

FOREIGN PATENT DOCUMENTS 1290980    9/1972   (GB) .
2021078   10/1994   (RU) .

*Primary Examiner*—Daniel J. Jenkins
(74) *Attorney, Agent, or Firm*—Blank Rome Comisky & McCauley LLP

(57) ABSTRACT

The present invention discloses a method of manufacturing a face seal wherein an annular groove on the face seal substrate is filled with a mixture of a metal binder and refractory metal carbide and pressed. A second metal binder layer is then placed upon the pressed mixture and a second pressing step is performed to form an integral green body of the first pressed mixture and the second metal binder layer. The integral green body is then heated to consolidate and adhere the green body to the substrate.

13 Claims, No Drawings

METHOD OF MANUFACTURING OF A MECHANICAL FACE SEAL

FIELD OF THE INVENTION

The present invention relates to the field of powder metallurgy and more particularly to manufacturing of mechanical face seals from cemented carbides.

Such face seals usually are configured as disc shaped substrate made of an iron based alloy and provided with a ring like annular insert made of a wear resistant material. For the sake of brevity these seals will be further referred to as seals provided with working ring and the seals which are fully made of cemented carbide will be further referred to as solid carbide seals.

The ring insert is disposed within a corresponding groove previously cut in the seal substrate and is firmly adhered thereto. By virtue of high wear-resistance such face seals are widely used in various industrial fields and in particular in chemical industry for sealing shafts of mechanical rotary/centrifugal pumps. It should be understood however that the present invention is not limited strictly to manufacturing of mechanical face seals for pumps. The present method can be employed for manufacturing of face seals suitable for exploitation in any other heavy duty, abusive application where high abrasive resistance in combination with good mechanical properties is required. Among these applications can be mentioned seals for submersible electric motors for oil production from wells, seals for electric drills for oil well drilling, seals for turbo generators and compressors etc.

BACKGROUND OF THE INVENTION

Mechanical face seals provided with annular working ring made of cemented carbide are known and their advantages in comparison with mechanical solid carbide seals are explained for example in U.S. Pat. No. 4,280,841 assigned to Nippon Tungsten Co.

In this patent is described manufacturing of mechanical seal provided with a cemented carbide hardened layer or ring which is firmly bound to the seal substrate. According to one of the embodiments disclosed in this patent powder of tungsten carbide mixed with an addition of 6.5 percent of Co is placed within a groove formed in stainless steel substrate and is compressed therein to produce a green compact. The compact is then presintered by heating in vacuum to obtain carbide layer with the thickness 1.3 mm. Then a paste which is a mixture of Ni—P alloy is coated or sprayed onto the presintered compact and finally the presintered carbide compact is heated in a non-oxidizing atmosphere to obtain cemented carbide hardened layer strongly bonded with the substrate by virtue of diffusion-bonding effect.

The disadvantage of this method lies in the fact that use of low melting Ni—P alloy does not allow obtaining cemented carbide working ring with sufficient hardness. The function of Ni—P contained in the upper layer is merely to infiltrate into the bulk of the tungsten carbide and to provide for soldering with the substrate. The reported hardness in the '841 patent of the working ring lies between $H_v$ 720–850 which is almost two times less than that of the solid carbide. Despite it is stated in the patent that the above hardness showed improved wear resistance one can assume that it might be still insufficient for many heavy duty applications. Moreover, due to relatively low hardness one can expect that mechanical end seal rings manufactured by this method have high coefficient of friction and are prone to seizure at relatively low loads.

The further disadvantage of the known method is associated with the fact that the thickness of the obtained working ring is limited to only 1.3 mm which shortens the service life of a seal provided with such a ring.

In GB1290980 is disclosed method of obtaining a wear-resistant surface on a steel part. This method comprises coating of at least the bottom of the groove made in the part by a copper layer, placing thereon a layer of powdered tungsten carbide, pressing this layer within the groove, superimposing an upper layer of copper powder on the layer of tungsten carbide, pressing the copper layer and then heating the whole part in a neutral atmosphere which is sufficient to melt the copper. The copper residing in the upper layer melts, impregnates the bulk of tungsten carbide portion and binds thereof, while the copper layer placed on the bottom of the groove provides reliable soldering of the bulk tungsten carbide portion to the substrate.

Unfortunately since copper is very prone to corrosion in presence of many industrial gases and liquids, especially $H_2S$, organic acids, sulfuric acid, ammonia, sodium hydroxide, distilled water or natural gas the face seals manufactured by the above method are not suitable for use in those industrial applications where such gases or liquids might be expected.

Furthermore, the necessity in coating the groove walls by the copper layer renders this method technologically complicated.

In RU2021078 is described method of production of wear-resistant layer on working end surface of a face seal. This method involves filling circular groove made in a steel based substrate by a powdered tungsten carbide, pressing thereof within the groove, placing on the green compact of a layer of powdered Cu—P alloy, pressing this layer and then heating the substrate in vacuum until the upper layer melts and impregnates the tungsten carbide portion. It is mentioned that Cu—P effects reliable soldering between the substrate and tungsten carbide and thus eliminates the necessity in preliminary coating the groove by a copper layer.

Unfortunately since this method also utilizes copper it is inevitably associated with the same disadvantage, i.e. the seals manufactured according to this method are insufficiently chemically resistant in the presence of industrial or natural fluids.

In conclusion it should be emphasized that despite the fact that different methods for manufacturing of mechanical end seals employing working cemented carbide ring have been devised there is still a need for a new method ensuring producing of such face seals with improved performances comparable with the seals made of solid carbide, but being cheaper than solid carbide face seals.

OBJECT OF THE INVENTION

The object of the present invention is to provide a new and improved method for manufacturing of mechanical end seals enabling sufficiently reduce or overcome the above mentioned drawbacks of the known in the art methods.

In particular the main object of the present invention is to provide a new and improved method of manufacturing of mechanical face seals having improved hardness comparable with that of the solid carbide.

The further object of the present invention is to provide a new and simple method of manufacturing of mechanical end seals having improved friction properties and wear resistance by virtue of low coefficient of friction and high resistance to seizure.

The third object of the present invention is to provide new method of manufacturing of mechanical seals ensuring high strength of the working ring and reliable adhesion thereof to the substrate.

Still further object of the invention is to provide a new and improved method of manufacturing of mechanical face seals with improved chemical resistance by virtue of eliminating copper in their composition.

The above and other objects and advantages of the present invention can be achieved in accordance with the following combination of its essential features, referring to different embodiments thereof.

According to one of the preferred embodiments the present method is suitable for manufacturing of mechanical face seals, said seals configured as an iron based alloy substrate provided with annular groove. The groove is filled with a wear resistant material comprising at least one refractory metal carbide and a binder. The method comprises the following main sequence of steps:

filling the annular groove formed in the substrate with a powdered mixture of refractory metal carbide and the binder, applying first external pressure onto said powdered mixture so as to produce a compacted bulk portion thereof, said compacted bulk portion being disposed within the annular groove, placing a powder of the binder onto the upper surface of the compacted bulk portion so as to obtain thereon an upper layer of the powdered binder, applying second external pressure onto said upper layer so as to press thereof together with the compacted bulk portion and to produce an integral green body, heating said substrate in a non oxidizing atmosphere at a temperature sufficient to induce infiltrate and diffusion of the binder from the upper layer portion into the bulk portion, said diffusion resulting in sintering the integral green body is accompanied by reliable adhesion of the green body to the substrate.

In accordance with the further embodiment the amount of refractory metal carbide in said powdered mixture is at least 80 weight percent with the reminder being the binder.

In the other embodiment said refractory metal carbide is tungsten carbide and said binder is nickel based alloy.

In yet another embodiment metal carbide in said powdered mixture has particle size of not less than 50 microns.

In accordance with still further embodiment said filling step is carried out to fill the annular groove up to at least the half of the depth thereof.

As per other embodiment said heating step is carried out in vacuum $10^{-2}$–$10^{-3}$ mm Hg, at 1200–1300 degree C., during at least 2 hours.

According to the further embodiment the nickel based alloy contains at least 70% of nickel and has hardness of at least Hc 58.

And in accordance with still further embodiment said refractory metal carbide is at least one carbide of a metal selected from the group IVb, Vb, VIb of the periodical table or their mixtures.

The present invention in its various embodiments has only been summarized briefly. For better understanding of the present invention as well of its advantages, reference will now be made to the following description of its embodiments.

DETAILED DESCRIPTION OF SPECIFIC EMBODIMENTS

The present invention basically employs similar steps which were mentioned in connection with RU2021078. These steps comprise filling of a groove made in a steel based substrate with powdered tungsten carbide, pressing thereof to obtain green bulk portion, placing on the upper surface of the bulk portion a layer of powdered binder, pressing the binder together with the compact and then sintering the substrate in a non oxidizing atmosphere. However in contrast to the known method which employs solely powdered tungsten carbide within the bulk portion it has been unexpectedly revealed that very good mechanical properties of the working ring in combination with reliable adhesion thereof to the substrate can be achieved if the groove is filled with a mixture consisting of powdered tungsten carbide and the same binder which is placed further on the upper surface of the compacted bulk portion. It has been empirically found that it is very advantageous to use as a suitable binder nickel based alloy with hardness of at least 50 Hc and with melting point which is lower than the softening point of the substrate material.

During the sintering step the binder contained in the powdered mixture ensures good adhesion of the bulk portion to the substrate while the binder residing in the upper layer penetrates into the bulk portion and firmly consolidates thereof. Since the binder itself has high hardness its presence does not deteriorate the hardness of the sintered bulk portion.

By virtue of the above provisions it was possible to manufacture mechanical face seals with thickness of several millimeters and having excellent mechanical properties in terms of coefficient of friction, hardness, seizure and wear resistance. The mechanical properties of face seals manufactured in accordance with the invention were at least comparable with those of solid tungsten carbide seals and by far superior in comparison with the conventional working ring face seals.

Furthermore, since the present method does not employ copper or its alloys it might be expected that chemical resistance of the seals should be also improved.

Having explained the underlying idea of the present invention it will be now disclosed in more details with reference to the following non limiting example 1.

EXAMPLE 1

On the upper face of a substrate made of stainless steel AISI 316 annular groove is cut having rectangular cross section. The groove's depth is about 5–6 mm. The groove is filled with powdered mixture of tungsten carbide and nickel based binder. The mixture consists of 90 weight percent of tungsten carbide powder having particle size 0.1–0.25 mm and 10 weight percent of binder having approximately the same powder size. As suitable row materials one can employ commercially available cast tungsten carbide powder, e.g. of the grade FTC, manufactured by company H.C. Starck GmbH & Co. KG. As a binder can be used commercially available powdered nickel alloy, e.g. of the grade N62SA, manufactured by company Wall Colmonoy Corp. The tungsten carbide powder has microhardness $H_v$—2100–2400 kg/mm$^2$ and the binder powder has hardness Hc—58–63. The groove is filled with the powdered mixture up to at least 0.5–0.6 of its depth. The mixture is then subjected to the first uniaxial pressure of 300–400 MPa so as to achieve dense compact which will constitute the bulk portion of the seal. On the upper surface of the bulk portion is homogeneously distributed powder of the same binder which is contained in the bulk portion. The amount of the binder placed on the bulk portion should be sufficient to fill the remainder of the groove at least up to the upper face of the substrate. The binder superimposed on the bulk portion constitutes the upper layer portion of the seal.

Then the upper portion is subjected to second uniaxial pressure preferably of the same magnitude as the first pressure so as to produce integral compacted green body constituting the body of the seal. The substrate and the green body residing in the groove are subjected to thermal treatment in non oxidizing atmosphere so as to induce melting and infiltration of the binder from the upper portion into the bulk portion accompanied by consolidation thereof. The binder residing in the bulk portion causes adhesion of the consolidated tungsten carbide to the groove. In practice the heat treatment step is carried out in vacuum furnaces capable to maintain vacuum of at least $10^{-2}$–$10^{-3}$ mm. The heat treatment is carried out at 1200–1300 degree C. during 2–3 hours.

After completing the thermal treatment the face side of the seal was subjected to flat grinding by diamond wheel to expose the tungsten carbide ring portion. Then the face side was lapped by diamond paste or powder to impart thereto required roughness and flatness. The height of the tungsten carbide insert in the final product was about 3 mm. Properties and performances of end seals manufactured in accordance with the above procedure were tested.

The measured microhardness of new seals was $H_v$—2000–2300 kg/mm² which is by far higher than $H_v$—1500 kg/mm² of the solid tungsten carbide.

The performances test included measurements of the friction between two seal rings lubricated with water under gradually increasing axial load. The velocity of rotation was 4000 RPM. The test was terminated at an axial load of 360 N or when seizure occurred and the friction increased substantially. The outside and inside diameters of the working insert (dam) were correspondingly as follows: $D_{out}$—35 mm, $D_{ins}$=27 mm.

The average friction coefficient of conventional solid carbide face seals and face seals manufactured according to the invention are summarized in table 1.

TABLE I

| Axial load in N | Conventional face seals made of solid carbide | Working ring face seals according to the invention |
|---|---|---|
| 15 | 0.073 | 0.078 |
| 330 | 0.0083 | 0.0096 |

It can be seen that friction coefficient of face seals manufactured in accordance with the present method is very close to that of the face seals made of the solid tungsten carbide. The resistance to seizure or maximum axial load at seizure inception was monitored and found that in one test the solid carbide face seals exhibited seizure at 180 N, while the seals manufactured in accordance with the invention exhibited seizure between 210 and 345 N.

It has been also found that face seals manufactured by the present invention have additional significant advantages like high resistance to wear and vibration due to absence of thermal cracking and low brittleness and increased service life due to possibility to achieve larger height of the working insert.

It should be appreciated that the present invention is not limited to the above-described embodiments and that changes and modifications can be made by one ordinarily skilled in the art without deviation from the scope of the invention, as will be defined in the appended claims.

For example instead of tungsten carbide one can use in the mixture other carbides of refractory metals of groups IVb, Vb, VIb of the periodical table, e.g. titanium carbide, tantalum carbide etc.

The amount of the carbide component in the powdered mixture can vary between 80 and 95 weight percent and the particle size of the powder mixture preferably varies between 50–250 micron.

The nickel-based alloy of the binder can contain lesser amount of nickel as far the binder hardness and melting point match the above mentioned requirements.

It should also be appreciated that the features disclosed in the foregoing description, and/or in the following claims, and/or in the accompanying example and rable may, both separately and in any combination thereof, be material for realizing the present invention in diverse forms thereof.

What is claimed is:

1. A method of manufacturing of a mechanical face seal, said seal configured as an iron based alloy substrate provided with an annular groove filled with a wear resistant material comprising at least one refractory metal carbide and a binder, said method comprising the steps:
   a) filling the annular groove formed in the substrate with a powdered mixture comprising a refractory metal carbide and a metal binder,
   b) applying a first external pressure to said powdered mixture to produce a compacted bulk portion within the annular groove,
   c) placing additional metal binder powder onto the upper surface of the compacted bulk portion to form an upper layer of the powdered metal binder,
   d) applying a second external pressure to said upper layer and said compacted bulk portion to produce an integral green body,
   e) heating said substrate and said integral green body in neutral or reducing atmosphere at a temperature sufficient to induce infiltration and diffusion of the metal binder from the upper layer into the compacted bulk portion, said heating resulting in consolidation of the integral green body and reliable adhesion thereof to the substrate.

2. The method as defined in claim 1, in which said powdered mixture contain at least 80 weight percent refractory metal carbide.

3. The method as defined in claim 2, in which said refractory metal carbide is tungsten carbide and said metal binder is nickel based alloy.

4. The method as defined in claim 3, in which said powdered mixture has particle size of 0.05–0.25 mm.

5. The method as defined in claim 1, in which said filling step is carried out to fill the annular groove up to at least the half of the depth thereof.

6. The method as defined in claim 1, in which said heating step is carried out in vacuum $10^{-2}$–$10^3$ mm at Hg. at 1200–1300 degree C. during at least 2 hours.

7. The method as defined in claim 3, in which said alloy contains at least 70% of Nickel and has hardness of at least Hc 58.

8. The method as defined in claim 1, in which said refractory metal carbide is at least one carbide of a metal selected from the group IVb, Vb, VIb of the periodical table or their mixture.

9. The method of of claim 1, wherein said resulting consolidated green body has a Vickers hardness value ($H_v$) of at least 2000 kg/mm².

10. The method of claim 4, wherein said resulting consolidated green body has a Vickers hardness value ($H_v$) of at least 2000 kg/mm².

11. The method of claim 1, wherein the first external pressure applied (step b) is 300–400 Mpa.

12. The method of claim 2 wherein said refractory metal carbide powder comprises cast tungsten carbide.

13. A mechanical face seal made in accordance with the method of claim 12.

* * * * *